United States Patent [19]

Koeninger

[11] Patent Number: 5,604,681
[45] Date of Patent: Feb. 18, 1997

[54] COUPLER IDENTIFICATION SYSTEMS

[75] Inventor: Robert C. Koeninger, Fairfield, Ohio

[73] Assignee: Dover Corporation, New York, N.Y.

[21] Appl. No.: 253,545

[22] Filed: Jun. 3, 1994

[51] Int. Cl.$^6$ ....................................... B67D 5/01
[52] U.S. Cl. ........................ 364/509; 137/177; 455/66
[58] Field of Search ..................... 455/66; 137/177, 137/251.1, 798; 251/149.1–149.9; 364/509, 469

[56] References Cited

U.S. PATENT DOCUMENTS

| | | | |
|---|---|---|---|
| 4,263,945 | 4/1981 | Van Ness | 340/147 A |
| 4,469,149 | 9/1984 | Walkey et al. | 141/94 |
| 4,846,233 | 7/1989 | Fockens | 340/552 |
| 4,977,935 | 12/1990 | Durkee, Jr. et al. | 285/18 |
| 5,156,198 | 10/1992 | Hall | 340/572 |
| 5,343,906 | 9/1994 | Tibbals, III | 141/83 |
| 5,359,522 | 10/1994 | Ryan | 364/465 |
| 5,379,916 | 1/1995 | Martindale et al. | 222/1 |

Primary Examiner—Ellis B. Ramirez
Assistant Examiner—Craig Steven Miller
Attorney, Agent, or Firm—Kinney & Schenk

[57] ABSTRACT

A system for blending fluids comprises a plurality of fluid sources to which utilization conduits are selectively connected. The blending operation for a predefined combination of fluids is controlled by a computer employing a software control program. An rf signal tag is mounted on each utilization conduit. When the utilization conduit is connected to a supply conduit for a given fluid source, a utilization signal input is provided to the computer and control program to provide assurance that the predefined fluids are connected for a given blending operation as well as the utilization conduit being properly locked on the supply conduit.

16 Claims, 5 Drawing Sheets

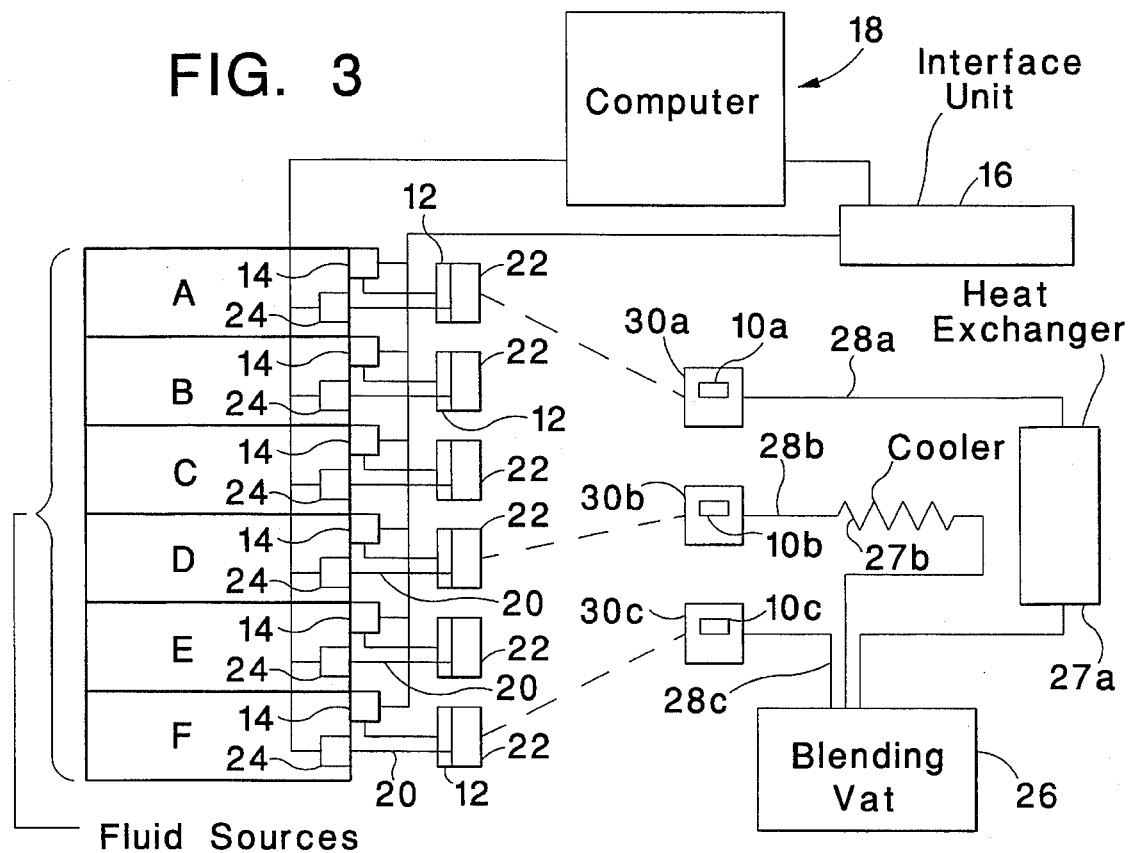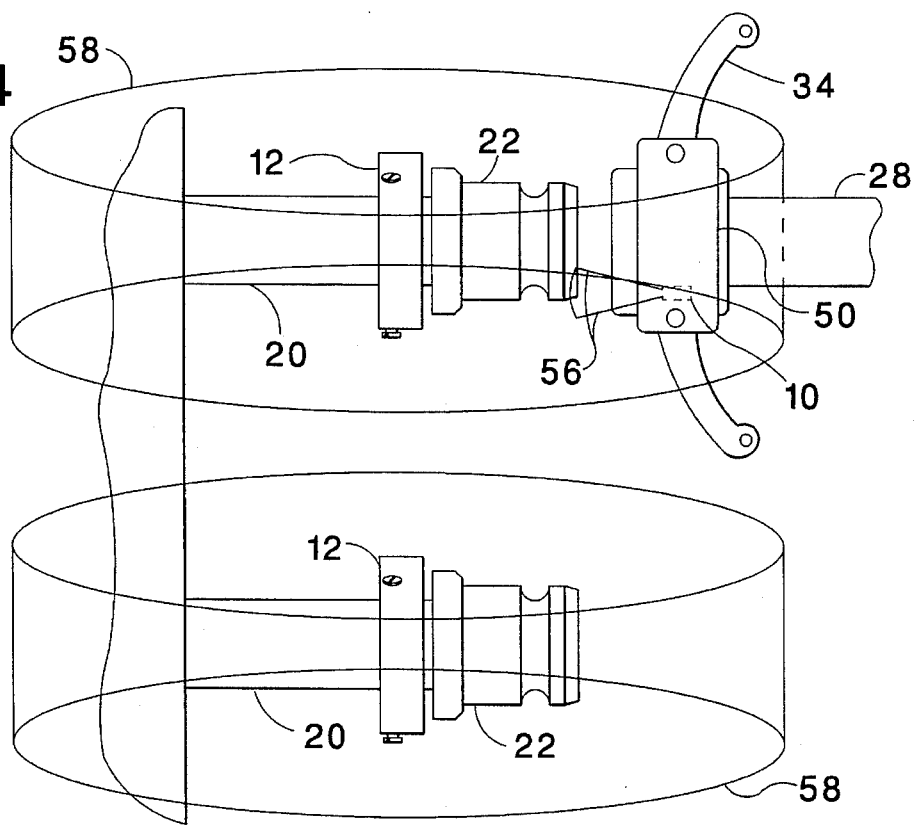

FIG. 9
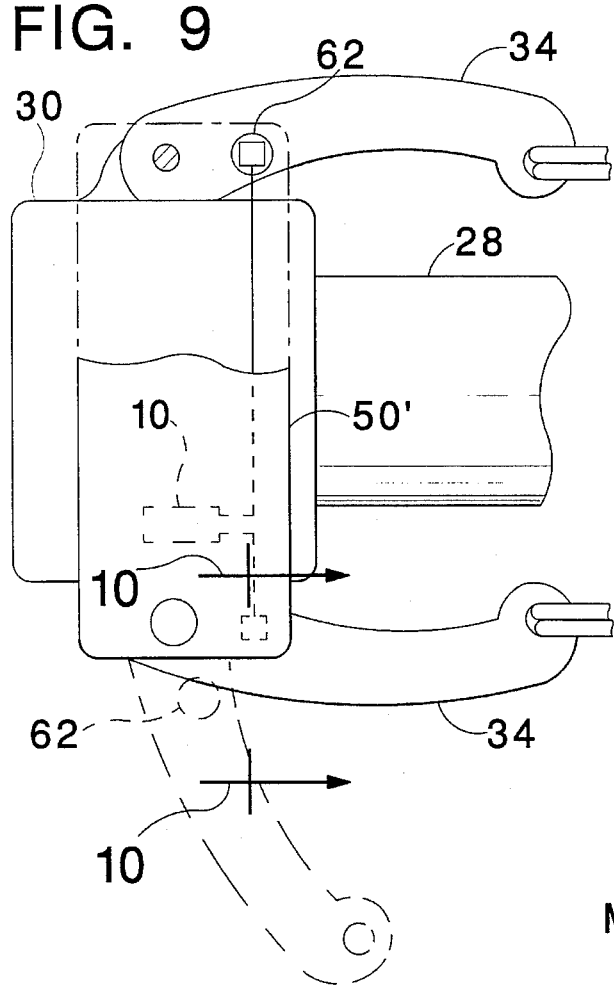
FIG. 10
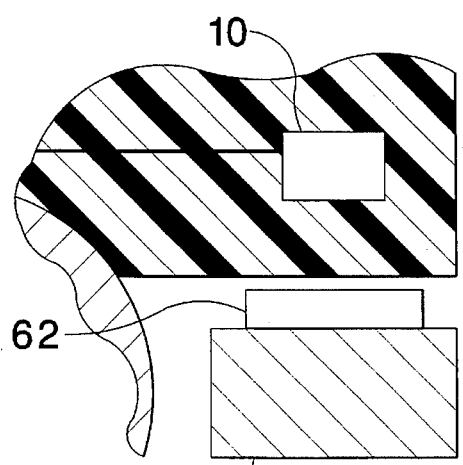
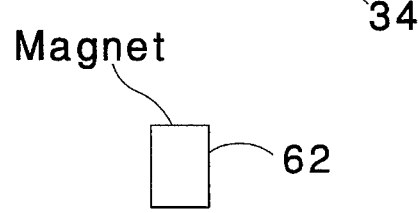
FIG. 11
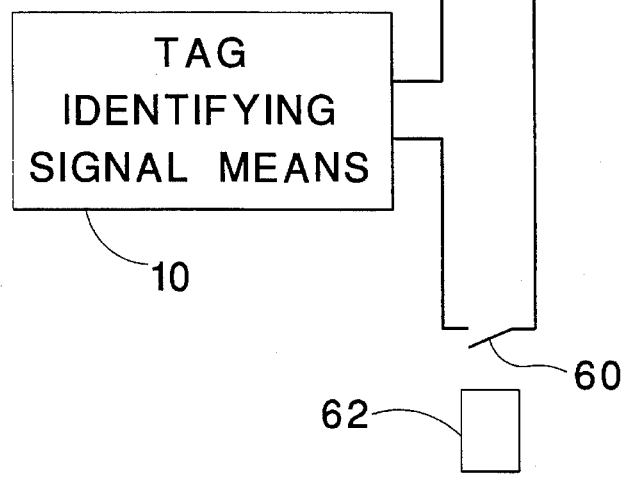

COUPLER IDENTIFICATION SYSTEMS

The present invention relates to improvements in controlling the selection of fluids to be delivered for an end use and more particularly to improved means for identifying coupler connections so as to give assurance that a desired fluid is being delivered through a conduit system.

The present invention is motivated by the needs of the chemical batch blending industry. This industry is highly automated with sophisticated Programmable Logic Controllers (PLC's), level gauging, temperature sensors, and air operated valves controlled by a host computer system. In the usual case, the only manual operation, in such systems, is the connection of hoses to configure the blending process, i.e., establish which fluid components are to be fed to a vat or other container in which they are to be blended. These connections are typically made pursuant to written instructions from a setup sheet. There can be as many as 30 different cam and groove fittings to be selected. This process is prone to error and is the frequent cause of spills or improperly blended material, oftentimes of a hazardous nature, requiring a controlled disposal. It is also important to note that some chemicals may react violently if improperly brought into contact with each other.

The industry is currently evaluating proposals for, and actively pursuing additional means for verifying that fluid connections are correct before enabling a blending process. Previous proposals include attaching proximity sensors to the coupling and verifying the connection was made. While this verifies that a hose is attached to a particular fitting, it cannot distinguish which of many possible hoses is connected. More specific proposals involve attaching a small air hose to fiber optic cable to the hose assembly. This permits an air or optical signal to be transmitted through an adjacent cable to signal which hose is connected.

Providing the desired identification means is particularly difficult because of the hostile environment found in many blending industry installations.

Basically what is involved is the connection of a conduit to a supply source through the use of a coupling comprising a fixed adapter and a coupler mounted on the hose. A widely employed coupling comprises an adapter having a groove and a coupler having a pair of cam levels that engage the groove to lock the coupler to the adapter. This type of coupling is employed on hoses that have diameters in the order of four inches, or more, and are relatively stiff. Such hoses, with their attached couplers are heavy and unwieldy, making impractical identification schemes that would depend on rotation of the coupler relative to the adapter in the connection process.

Being heavy and unwieldy, the hoses and attached adapters are frequently subject to physical abuse that negates the use of many other identification schemes. A final aspect of the hostile environment is that the fluids being blended are frequently highly corrosive, necessitating that any elements of an identification system must be resistant to corrosive action.

Accordingly, the primary object of the invention is to provide assurance that coupler connections in a fluid blending system conform to a predetermined combination of sources.

A further object of the present invention is to accomplish the foregoing end in an economical manner and in particular to economically enable such end to be accomplished with a minimum modification of existing blending equipment to the further end of facilitating retrofitting existing blending equipment in providing assurance that desired fluids are being blended.

In a broad sense, the basic problem involved is in providing assurance than a desired fluid has been connected for treatment in a system where there is a plurality of fluid sources which can be connected for treatment.

Accordingly, the broader aspects of the invention are to achieve the foregoing stated ends in a treatment system which involves the treatment of one or more fluids that could be selected from a plurality of fluid sources.

Such broad ends may be achieved in a system for treating fluids selected from a plurality of fluid sources, where the systems comprise a plurality of supply conduits, respectively, connected to known, fluid sources. In such systems, each of the supply conduits has a distal end from which the fluid source, to which it is connected, may be discharged. Also, included is at least one utilization conduit having a distal end adapted for connection to the distal end of a supply conduit. Further include are means for sealingly connecting the distal end of the utilization conduit to the distal end of any one of the supply conduits.

The system includes utilization signal generating means which are characterized by antenna means disposed adjacent the distal end of each supply conduit and means for transmitting a request signal from each antenna means. A tag is disposed adjacent the distal end of the utilization conduit. The tag comprises means for generating an identifying signal. The means for generating an identifying signal are actuated by the request signal transmitted from the antenna means of a supply conduit when the utilization conduit is connected thereto. Means, responsive to generation of the identifying signal, generate a utilization signal which is indicative of the supply conduit to which the utilization conduit is connected.

Computer and control program means may further comprises the system to provide output signals for controlling treatment of a predefined fluid. In this event, the computer and control program means are responsive to and require a utilization signal output indicating connection of the utilization conduit with the supply conduit for the preselected fluid, in order to provide signals for controlling treatment of the predefined fluid.

The system for treating fluids may further be characterized in that each antenna comprises a wound coil disposed generally coaxially of the supply conduit with which it is associated and generates a magnetic field which is disposed coaxially of that supply conduit, the magnetic field being toroidal and having a longitudinal dimension substantially greater than its diameter. Additionally, the tag of the utilization conduit may include an antenna having a magnetic field propagated longitudinally outwardly from the distal end of the utilization conduit.

In a broader sense the antenna means are such that an "identifying" signal is generated when the utilization conduit is connected to a supply conduit, irrespective of the angular orientation of the coupling means.

Other features of the invention are found in the coupling means comprising an adapter mounted on the distal end of each supply conduit, and a coupler, mounted on the distal end of the utilization conduit, that is releasably connectable to any adapter. The tag is then mounted on the coupler.

In a preferred embodiment, the coupler is of the type comprising a pair of locking levers and a pair of pins disposed, respectively, on opposite sides of the coupler, the levers being, respectively, pivoted on the pins. The pins on which the levers are mounted are also employed in mounting the tag. In a more specific sense the coupler comprises a generally tubular body, a pair of lugs projecting outwardly from diametrically opposed sides of the tubular body. The tag is in the form of a relatively thin wafer and is disposed in a mounting block. The mounting block transversely spans the coupler body and rests on the coupler body lugs. The lever pins extend through the mounting block, the lugs and the levers in providing for the pivotal mounting of the levers and mounting of the tag.

A preferred form of antenna means for each supply conduit is characterized by an annular housing and a wound, wire coil. Advantageously these antenna means further comprise an annular bobbin having a circumferential groove in its outer surface, with the wound coil disposed in said groove. The annular frame has a counterbore in which the bobbin is received, and the bobbin is sealed within said counterbore.

A further feature of the invention is found in the provision of means which, additionally, indicate that a utilization conduit is properly locked on a supply conduit. To this end the utilization signal generating means are normally inoperative. This end is, advantageously, attained through the provision of a normally open switch, in series with the identifying signal generating means. Means are then provided to render the identifying signal generating means operative in response to the utilization conduit being properly locked on the supply conduit.

In more limited aspects of the invention, coupling means include a coupler mounted on the utilization conduit and adapters mounted on the distal ends of the supply conduits. The coupler is sealingly connectable with any one of the adapters and is lockable thereon by means of locking levers that are pivotal on the coupler. The means for rendering the utilization signal generating means inoperative may take the form of a normally open switch for the identifying signal generating means. This switch is then closed when one of the locking levers is swung to its locking position. Other preferred features include the provision of two normally open switches, that are closed by swinging both of the locking levers to their locking positions. Also, the tag, which includes identifying signal means is preferably disposed in a protective block mounted on the coupler. The normally open switch means are also disposed in the block and are of the magnetic type. The locking lever is then provided with a magnet, which, when the locking lever is in a locking position, cause the normally open switch to close, thereby rendering the identifying signal generating means operable.

The above and other related objects and features of the will be apparent from a reading of the following description of a preferred embodiment, with reference to the accompanying drawings, and the novelty thereof pointed out in the appended claims.

In the drawings:

FIG. 3 is a further showing of the automated fluid blending system;

FIG. 4 is a plan view illustrating, in simplified fashion, antenna program fields of signal transmission, receiving means employed herein;

FIG. 9 is a plan view of a modified coupler, provided with means for assuring that the coupler is locked in order to activate the tag means therefor;

FIG. 10 is a fragmentary section taken on line 10—10 in FIG. 9; and

FIG. 11 is a schematic illustrating operation of the means illustrated in FIG. 9.

As indicated above, the present invention is based on and makes use of known technology which operates by means of the principles of mutual magnetic inductance and which is commonly referenced as radio frequency identification systems. Both power and data are transmitted via low power radio frequency (RF) magnetic fields. The signal frequencies are of a low magnitude, generally in the order of 148 kHz–37 kHz, which are not subject to governmental regulation, and do not require licensing.

Figure 1:
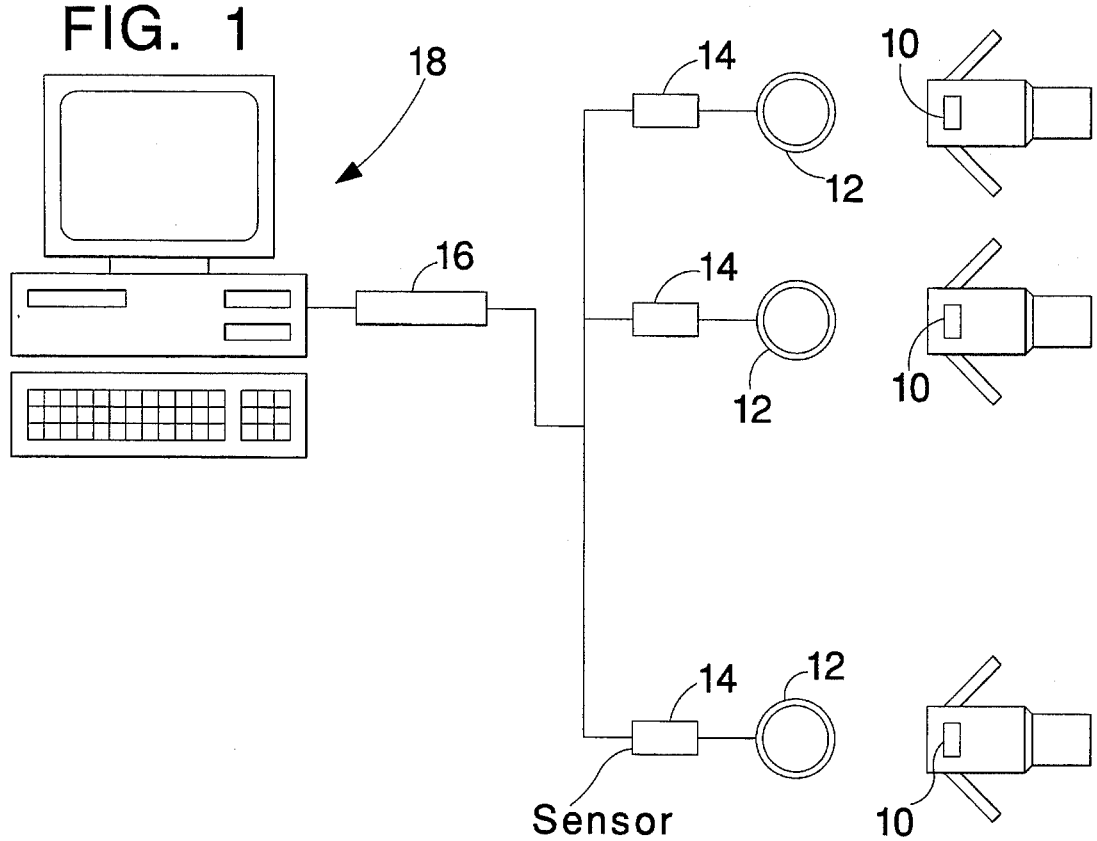
FIG. 1 is a schematic showing of an automated, fluid blending system in which the present invention is embodied.

The basic elements of a radio frequency identification system (reference FIG. 1) comprise a tag 10, an antenna 12 and a sensor unit 14. The basic operation of a radio frequency identification system is predicated on the sensor unit 14 generating a "request" signal at one frequency, e.g., 148 kHz, which is propagated from the antenna 12. The tag 10 comprises means for generating a unique, "identifying" signal, at another frequency, e.g., 37 kHz, that is sensed by the antenna 12 and transmitted to the sensor unit 14. The sensor thus functions as both a transmitter and receiver, for signals propagated from and sensed by the antenna 12. The sensor may be connected to an interface unit 16 which can incorporate means for converting a sensed "identifying" signal to an ASCII format. The ASCII signal, which would be unique to the "identifying" signal of a given tag, may then be transmitted to a central processing unit (CPU) of a computer 18. The interface unit 16 can also include means for discriminating between several sensing units to the end that the ASCII signal input to the computer 18 indicates the "identifying" signal for a given tag and, also, the sensing unit that detected such "identifying" signal.

As thus far described, the radio frequency identification system is well known in the prior art and a further detailed description is not necessary insofar as the generation of a computer signal input which reflects the detection of a given tag "identifying" signal at a given sensor, is concerned.

Reference is next made to FIG. 3, which diagrammatically depicts a blending system which comprises a plurality of fluid sources, herein illustratively represented as six sources designated "A" through "F". Each source could be a tank or other container. Each fluid source includes an outlet conduit 20, which terminates in an adapter 22. A valve 24 is provided for each conduit 20 to control the flow of fluid from each of the fluid sources. See also FIG. 2.

The function and purpose of this system is to provide for the blending of fluids from selected sources, of the sources "A" through "F" in a blending vat 26. To this end flexible conduits 28 extend from the blending vat 26, each having a coupler 30 at its distal end. The dotted lines in FIG. 3 indicate that fluid sources "A", "D" and "F" are to be connected to the blending vat 26 for blending therein.

Figure 2:
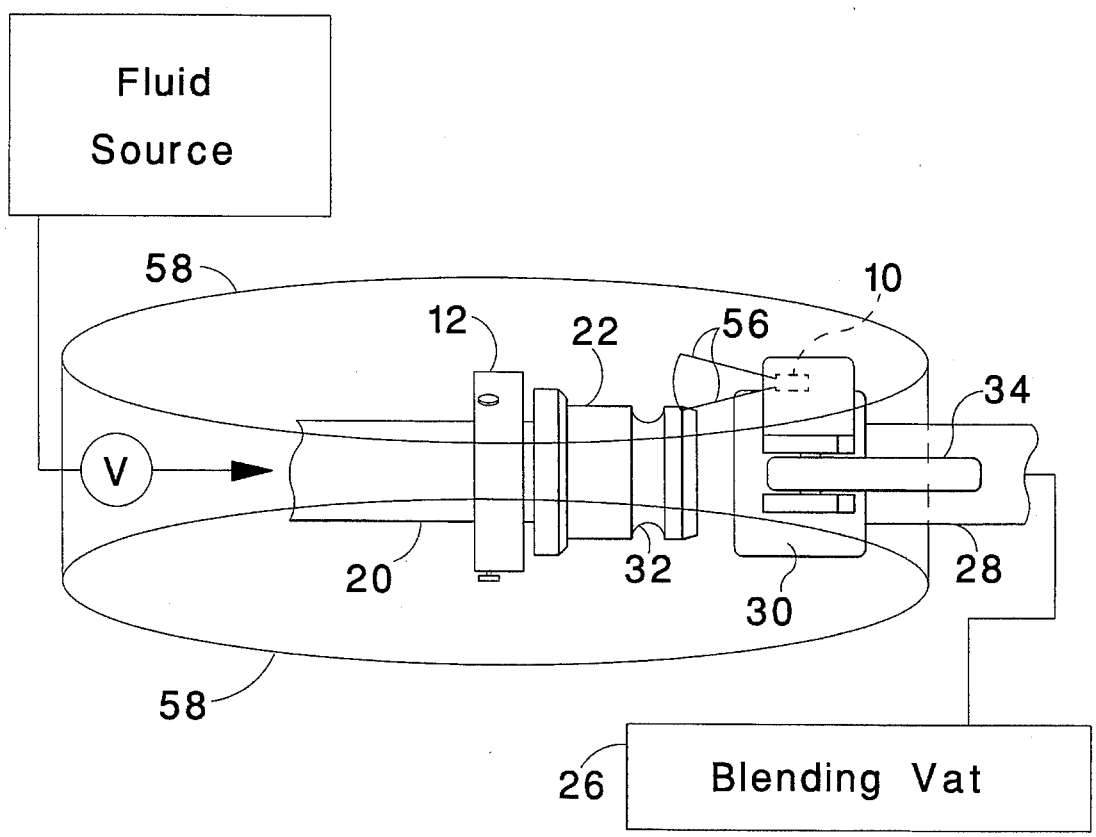
FIG. 2 is a simplified showing of a coupling embodying the present invention.

The adapters 22 are of the type comprising a circumferential locking groove 32 (reference FIG. 2). The couplers 30 are of the type comprising a pair of pivoted levers 34. In operation, a coupler 30 is telescoped over an adapter 22. The levers 34 are then swung into general alignment with the axis of the coupler 30. In so doing, the inner ends of the levers 34 engage the coupler groove 32 and lock the coupler 30 in sealed relation on the adapter 22. A given coupler and adapter compositely form what is frequently referenced as a quick connect/disconnect coupling. Such couplings are well known in the art, and exemplary coupling being found in U.S. Pat. No. 4,519,635.

An antenna 12 is mounted adjacent the adapter 22 for each of the fluid sources "A" through "F". A sensor 14 is mounted adjacent each of the antennas 12, with an electrical connector connection therebetween. A tag 10 is mounted on each of the couplers 30. In carrying out a blending operation, the couplers would be manually connected to and locked on selected adapters 22, here indicated to be the adapters for fluids "A", "D" and "F". The output signals for the sensors 12 for the fluid sources "A", "D" and "F" are then transmitted to an interface unit 16, which generates ASCII output signals, indicating that fluid sources "A", "D" and "F" are connected to blending vat 26 and further that source "A" is connected by way of coupler 30a, source "D" is connected by way of coupler 30b and source "F" is connected by way of connector 30c. Thus, in a blending process, the conduit 28a can provide for a heat exchange function (schematically indicated as heat exchanger 27a); for fluid passing therethrough, while conduit 28b can provide for a cooling function (schematically indicated as cooler 27b), while conduit 28c extends directly to the vat 26. By reason of the tags 10a, 10b and 10c each generating a different, unique identifying signal, the ASCII signals generated by the interface unit 14 also indicate that fluid "A" is connected to flow though conduit 28a, fluid "D" is connected to flow through conduit 28b and fluid "F" is connected to flow through conduit 28c.

Computer 18 is provided with a software, operating program for controlling the blending system, Computer programs for controlling the operation of hardware are well known. For illustrative purposes, it is simply assumed that the sole function of the software program is to control operation of the valves 24 (which are of a solenoid controlled type) for the several fluid sources, for example, to open given valves for a predetermined length of time to blend selected fluids. In the present illustration, the selected fluids are "A", "D" and "F". When the couplers 30 are connected to the adapters 22 for those fluid sources, the ASCII signal outputs from the interface unit 16 reflect such condition as an input to the software program of the computer 18. Upon receipt of such input signals (herein references singularly and collectively as authorization signals), the computer provides output, control signals to the valves 24 for the fluid sources "A", "D" and "F". These valves are opened to discharge desired amounts of the fluids "A", "D" and "F" into the blending vat 26, with the assurance that fluid "A" will be pass through a heat exchange, fluid "D" will be cooled and fluid "F" will discharge directly into the blending vat.

The constructional features of the tags 10 and the antennas 12 are significant in providing the control system functions discussed above in the harsh environments commonly existing in blending operations.

Figure 6:
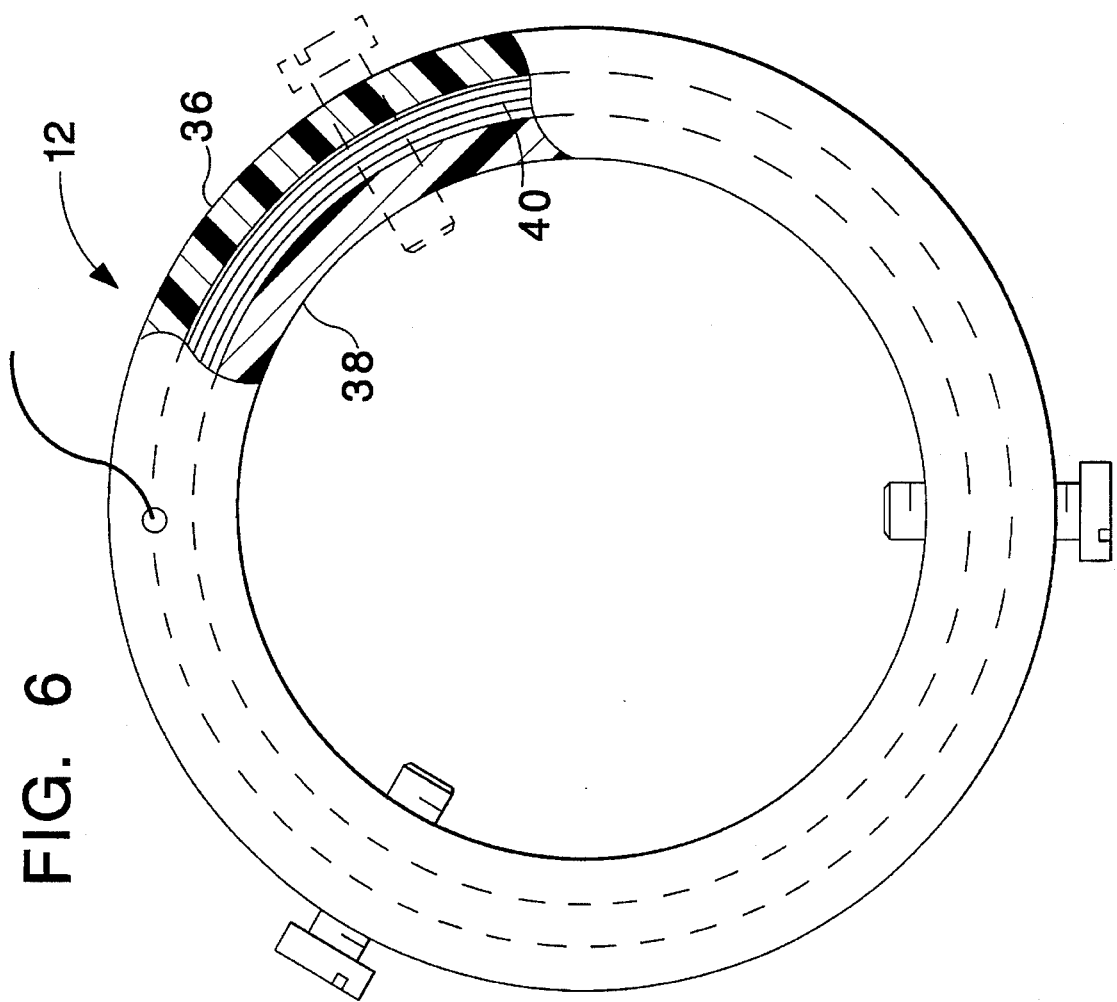
FIG. 6 is an end view of the same antenna, also partially in section.
Figure 5:
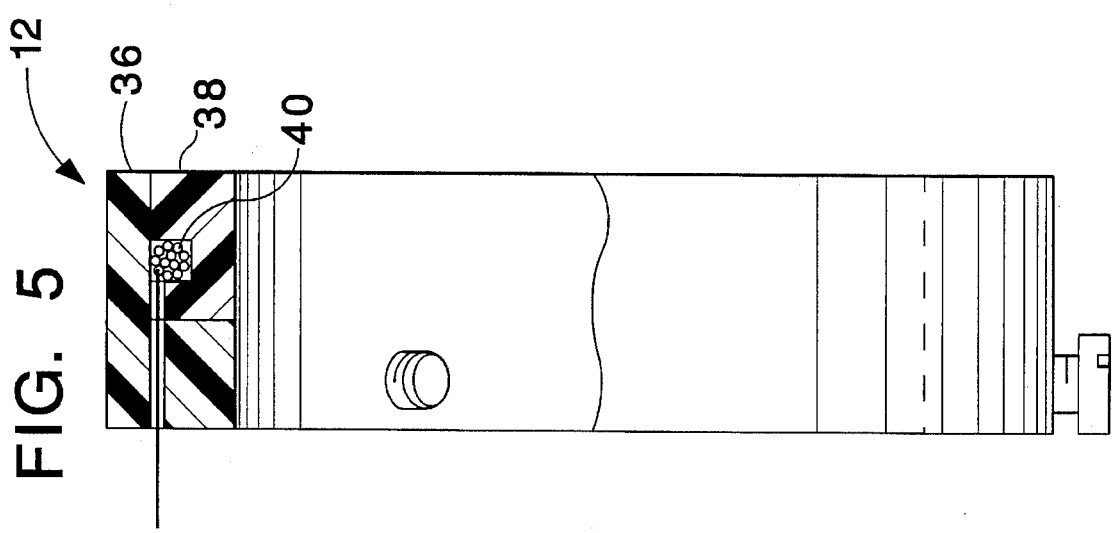
FIG. 5 is a side view, partially in section, of an antenna employed in the blending system.

These constructional features of the antenna 12 will now be described with reference to FIGS. 2, 5 and 6. The antenna 12 is in the form of a compositely formed annulus comprising a frame member 36 which is counterbored (recessed) to receive a bobbin 38. The bobbin has a circumferential groove in its outer surface. This groove facilitates the winding of a copper wire coil 38 that actually provides the antenna function of transmitting and receiving signals. The electrical leads for the antenna coil extend through a slot in the bobbin 38 and a hole in the side surface of the frame member 36 to extend to the associated sensor 12.

The number of turns for the antenna coil 40 as well as the diameter of the wire are all matters which are in within the abilities of one skilled in the art to provide the desired functions of transmitting a "request" signal and detecting an "identifying" signal.

The bobbin 38, with its wound coil 40, is assembled in the counterbore of the frame member 36 and then preferably, the mating surfaces are sealed and the hole, through which the coil leads, extends is also sealed so that there is essentially no exposure of the antenna coil to corrosive vapors that might exist in the blending apparatus environment.

The antenna 12 is, advantageously mounted on the conduit 20, immediately behind the adapter 22. This is accomplished by means of three screws 42 that are threaded through the body portion of the frame member 36. It is a simple matter to telescope the antenna annulus over the conduit 20 before the adapter 22 is mounted thereon. The screws 42 may then be rotated to secure the antenna in place. It is to be appreciated that the effectiveness of the antenna is not dependent on a highly precise relationship relative to the adapter 22, thus permitting the use of these economical mounting means which can be used without requiring and time consuming alignment or positioning procedures.

Figure 7:
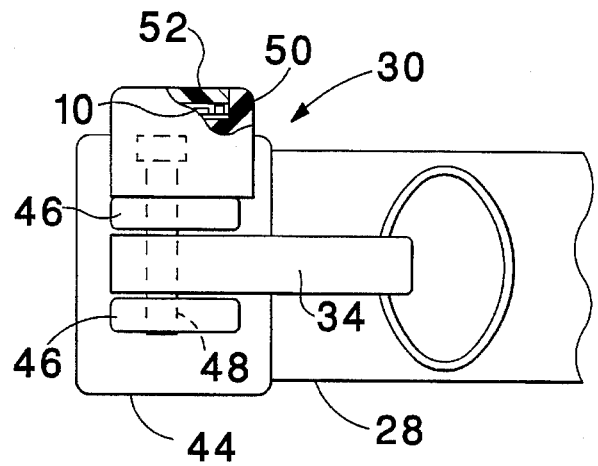
FIG. 7 is a side view of a coupler and tag assembly employed in the blending system.
Figure 8:
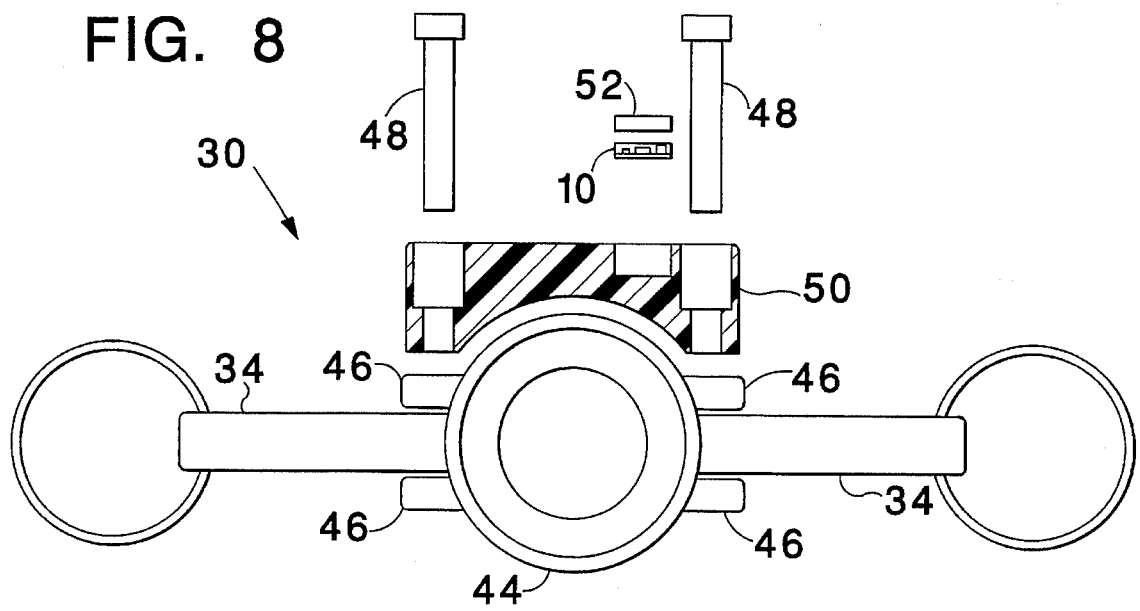
FIG. 8 is an end view, with components exploded of the coupler and tag assembly seen in FIG. 6.

The details of mounting the tag 10 will now be described in further detail, with reference to FIGS. 2, 6 and 7. The coupler 30 is of a known construction, adapted to be sealingly connected to the described adapter. The coupler 30 comprises a tubular housing 44 which is adapted to be telescoped over the distal end portion of an adapter 22. On diametrically opposed sides of the housing 44 are pairs of lugs 46 between which the previously referenced, locking levers 34 are disposed. The locking levers 34 are pivotal on pins 48 and are provided with pull rings that facilitate their movement, particularly in releasing them from a locking position. The Inner ends of the locking levers are disposed outwardly of the inner diameter of the housing 44 when the levers are swung to the outwardly projecting positions of FIG. 7. When the levers 46 are swung toward a position parallel to the axis of the housing 44, the inner ends of the levers swing inwardly to engage the groove 32 of an adapter 22. This action causes the adapter 22 to be sealed with respect to the coupler 30.

The tag 10 is mounted on the coupler 30 through the use of a mounting block 50. Physically, the tag comprises solid state electronic components that are encapsulated in plastic. The dimensions of a typical tag are in the order of ½"×1.5" with a thickness of approximately ⅛". The mounting block, advantageously has a generally rectangular, vertical outline, with a flat top surface and a bottom surface having pads for engaging the upper surfaces of opposed lugs 46 and recessed to clear the upper portion of the housing 44. The upper surface of the mounting block is recessed to receive the tag 10. After the tag is disposed in this recess an overlying protective cap is provided and the assembly sealed by resin or heat sealed, as appropriate to seal the tag in mounted relation on the mounting block 50.

The mounting block 50 is secured to the housing 44 by the same pins 48 that provide pivotal mountings for the locking levers 34. The pins simply pass through holes in the mounting block 50 that are aligned with the-previously existing holes in the lugs 46. Tags (10) may thus be provided for preexisting couplers (30) through the simple substitution of longer pins (48) for the preexisting pins on which the locking levers were originally pivoted.

Reference is next made to FIGS. 9–11 for a description of means which cause the (ASCII) utilization signals, directed to computer 18, to also indicate that the coupler is properly locked on the supply conduit from which the signal originated.

These means take the form of means for rendering the identifying signal generating means (of the tag 10) inoperative. These means are placed in series with two, normally open, magnetic switches 60. The switches 60 and their conductor connections to the tag 10 are preferable disposed in a modified block 50' to provide for their protection in the same fashion as the tag is protected.

The switches 60 are disposed in overlying relation to the levers 34, when those levers are pivoted to longitudinal positions wherein they engage the groove of an adapter and lock the coupler thereon. Magnets 62 are mounted on the levers 34, as by epoxy resin. When the levers 34 are swung to their locking positions, the magnets 62 underlie the respective switches 60 and cause them to close and complete the circuit for actuation of the identifying signal generating means.

Thus, for example, if coupler 30c is mounted on the adapter 20 for source "F", the locking levers 34 must be swung to their outwardly projecting positions, as indicated in FIG. 9. In these positions, the magnets 62 are displaced laterally of the switches 60 and these switch automatically assume their open positions. The identifying signal generating means of the tag 10 is inoperative and there is no output from the associated sensor unit 14. Only when both locking levers are swung to their locking positions will both switches 60 be closed to actuate the identifying signal generating means of the tag. It is also to be appreciated that a coupler must be mounted on an adapter in order for an identifying signal to be generated and for a signal to be transmitted from a sensor unit 12 to the interface unit 16. Since the locking levers must also be in their locking positions to generate an identifying signal, the ASCII signal input to the computer 18 indicates, not only which blending conduit is connected to which fluid supply, but also indicates that there is a locked connection the coupling therebetween.

It is to be appreciated that couplings of the illustrated type are frequently designed to be effective even though only one lever is swung to a locking position. Thus, it would a possible to employ a single switch 60, rather than the described use of two, switches.

A further feature of the invention is found in the nature of the magnetic field of the antenna 12, which is indicated in FIG. 2. The field is generally toroidal of the toroidal coil 40 and, further, is elongated. This field is of significance in that it allows the antenna field to extend beyond the distal end of an adapter so that it can interact with a tag mounted on an attached coupler, while, at the same time, minimizing the power transmission of the antenna. Further, the shape of the antenna's magnetic field minimizes its lateral propagation.

This is to point out that it is frequently desirable to have the outlet conduits (20) of several fluid sources in close proximity to facilitate the attachment of hoses thereto for incorporation of desired fluids in a blended mixture— reference FIG. 4. The tag 10 comprises a circuit assembly which includes an integrated circuit, with an internal memory, a printed circuit with integral data contacts and a directional bar antenna, all encapsulated in a plastic wafer, which is mounted as described above.

The point being made is that the conventional, commercially available tag assembly includes a directional antenna that propagates a directional field from a point source, directed outwardly of the end of the blending conduit, which field is indicated by lines 56. The magnetic field propagated by each antenna 12 is generally coaxial of its associated conduit 20 (and adapter 22) and is elongated in an axial direction, as indicated by lines 58. The significance of the toroidal magnetic field is that it completely surrounds, circumferentially, the associated coupler 22. It is, therefore, unnecessary to orient a coupler 30 relative to an adapter 22 in order to generate an "identifying" signal. This is of particular significance where heavy and unwieldy hoses are in use. The preferred type of coupling, as described, does not require angular orientation in order to be connected. The toroidal antenna field continues the flexibility of use, while providing the desired identification signal, employing a conventional tag.

The elongated field is significant in minimizing power levels, while at the same time isolating the request signals from antennas 12 on adjacent conduits 20, as well as assuring that the identifying signal generated by a tag will be detected only by the field of the antenna to which the coupler/tag, is connected.

It is also to be appreciated that the synthetic resin materials are employed for the antenna frame 36 and bobbin 38. The same applies for the tag mounting block 50. These materials may be selected, from commercially available resins, to provide a high degree of strength. Taking into consideration that a typical diameter for a conduit 28 is in the order of two or more inches, and more often in the order of 4 inches, it will be apparent that the antenna 12 and the tag/mounting block can be readily formed so as to be virtually immune to physical abuse in use.

It is also to be appreciated that such high strength synthetic resin materials can also be selected with the further property of providing minimal impedance to the transmission of radio frequency signals.

The described system and embodiments of the antenna and tag are for illustrative purposes and many variations therefrom will occur to those skilled in the art, within the spirit and scope of the present inventive concepts, as set forth in the following claims.

By way of example, and in nowise as a limitation, the number of source fluids is theoretically unlimited, though in a practical sense, the maximum number would be in the order of perhaps 40–50 fluids. Similarly the number fluids that are to be mixed can be other than three. In fact, the principles of the present invention, in a broad sense are applicable to assuring that a desired fluid source is connected to a discharge conduit. Also, in the broader aspects of the invention, other types of couplings can be employed, including couplings that incorporate self closing or manually operated valves. A further variation can be found in providing sensors that generate different "request" signal frequencies. The tag circuitry can be modified so that it is selectively responsive to a given "request" signal frequency, to the end of providing an alternate manner for identifying the hose connection to a given fluid source.

It is to be further appreciated that the blending of fluids is a specific manner of "treating" fluids and that the principles herein taught are applicable, in the broader aspects of the invention, to any type of treatment of fluids, whether or not they are actually blended. Likewise, the broader aspects of the invention, relating to the provision of means for identifying to which supply conduit a utilization conduit is attached, are applicable to systems where only a single fluid is to be treated.

Having thus described the invention, what is claimed as novel and desired to be secured by Letters Patent of the United States is:

1. A system for treating fluids selected from a plurality of fluid sources, said systems comprising a plurality of supply conduits, respectively, connected to known, fluid sources, each of said supply conduits having a distal end from which fluid in the fluid source, to which it is connected, may be discharged, at least one utilization conduit having a distal end adapted for connection to the distal end of a supply conduit, means for sealingly connecting the distal end of the utilization conduit to the distal end of any one of the supply conduits, and utilization signal generating means characterized by antenna means disposed adjacent the distal end of each supply conduit, means for transmitting a request signal from each antenna means, a tag disposed adjacent the distal end of the utilization conduit, said tag comprising means for generating an identifying signal,
said means for generating an identifying signal being actuated by the request signal transmitted from the antenna means of a supply conduit when the utilization conduit is connected thereto, and means responsive to generation of said identifying signal for generating a utilization signal indicative of the supply conduit to which the utilization conduit is connected, further characterized in that each antenna means comprises a wound coil disposed generally coaxially of the supply conduit with which it is associated and generates a magnetic field which is disposed coaxially of that supply conduit, said magnetic field being toroidal and having a longitudinal dimension substantially greater than its diameter.

2. A system for treating of fluids as in claim 1, wherein the supply conduits are disposed in closely spaced, side-by-side relation.

3. A system as in claim 2 further characterized in that said tag includes an antenna having a magnetic field propagated longitudinally outwardly from the distal end of the utilization conduit.

4. A fluid handling system comprising supply fluid conduit means, and utilization fluid conduit means, wherein at least one of the conduit means comprises
a plurality of individual conduits, and the other of the conduit means comprises
at least one individual conduit, said system further comprising means for connecting the individual Conduit from said other conduit means to a selected individual conduit of said one conduit means, said system further including utilization signal generating means for generating a signal indicating that desired individual conduits of the supply conduit means and the utilization conduit means are connected, said utilization signal generating means comprising
(i) antenna means associated with and disposed adjacent the distal end of each individual conduit of one of said supply conduit means and said utilization conduit means,
(ii) means for transmitting a request signal from each antenna means,
(iii) a tag associated with and disposed adjacent the distal end of each of the other of said conduit means, said tag comprising means for generating an identifying signal,
said means for generating an identifying signal being actuated by the request signal transmitted from the antenna means when the desired individual conduits of the supply and utilization conduit means are connected to each other, and
(iv) means, responsive to generation of said identifying signal, for generating the utilization signal indicative of the individual conduits which are connected, characterized in that each antenna means comprises a wound coil disposed generally concentrically of the conduit with which it is associated and generates a magnetic field which is disposed coaxially of that conduit, said magnetic field being toroidal and having a longitudinal dimension substantially greater than its diameter, further characterized in that said tag includes an antenna having a generally linear, magnetic field propagated longitudinally outwardly from the distal end of the conduit with which the tag is associated.

5. A fluid handling system comprising supply fluid conduit means, and utilization fluid conduit means, wherein at least one of the conduit means comprises
a plurality of individual conduits in relatively fixed and closely spaced relationship, and the other of the conduit means comprises
at least one individual conduit, said system further comprising means for sealingly connecting the individual conduit from said other conduit means to a selected individual conduit of said one conduit means, said connecting means comprising
a generally tubular adapter mounted on each individual conduit of one of said conduit means,
a coupler mounted on each individual conduit of the other of said conduit means, said system further including utilization signal generating means for generating a signal indicating that desired individual conduits of the supply conduit means and the utilization conduit means are connected, said utilization signal generating means comprising
(i) antenna means mounted on each adapter,
(ii) means for transmitting a request signal from each antenna means,
(iii) a tag mounted on each coupler,
said tag comprising means for generating an identifying signal,
said means for generating an identifying signal being actuated by the request signal transmitted from the antenna means when the desired individual conduits of the supply and utilization conduit means are connected to each other, and
(iv) means, responsive to generation of said identifying signal, for generating the utilization sisal indicative of the individual conduits which are connected, characterized in that each antenna means comprises a wound coil disposed generally concentrically of the conduit with which it is associated and generates a magnetic field which is disposed coaxially of that conduit, said magnetic field being toroidal and having a longitudinal dimension substantially greater than its diameter, further characterized in that each antenna means comprises an annular housing,
said housing having
a recess receiving the wound, wire coil, and
means for mounting the coil on the adapter.

6. A system as in claim 5 further characterized in that the antenna means further include an annular bobbin having a circumferential groove in its outer surface, with the wound coil disposed in said groove, the annular housing has a counterbore in which the bobbin is received, and the bobbin is sealed within said counterbore.

7. A system as in claim 6 further characterized in that antenna includes a plurality of mounting screws extending through the annular housing in longitudinally offset relation to the bobbin.

8. A fluid handling system comprising supply fluid conduit means, and utilization fluid conduit means, wherein at least One of the conduit means comprises
a plurality of individual conduits, and the other of the conduit means comprises
at least one individual conduit, said system further comprising means for connecting the individual conduit from said other conduit means to a selected individual conduit of said one conduit means, said system further including utilization Signal generating means for generating a signal indicating that desired individual conduits of the supply conduit means and the utilization conduit means are connected, said utilization signal generating means comprising
(i) antenna means mounted on each adapter,
(ii) means for transmitting a request signal from each antenna means,
(iii) a tag mounted on each coupler,
said tag comprising means for generating an identifying signal,
said means for generating an identifying signal being actuated by the request signal transmitted from the antenna means when the desired individual conduits of the supply and utilization conduit means are connected to each other, and
(iv) means, responsive to generation of said identifying signal, for generating the utilization signal indicative Of the individual conduits which are connected, characterized in that each antenna means comprises a wound coil disposed generally concentrically of the conduit with which it is associated and generates a magnetic field which is disposed coaxially of that conduit, said magnetic field being toroidal and having a longitudinal dimension substantially greater than its diameter, wherein the connecting means comprise an adapter mounted on the distal end of each individual conduit of one conduit means, and a coupler, mounted on the distal end of each individual conduit of the other conduit means, each coupler being releasably connectable to any adapter, and further characterized in that a tag is mounted on each coupler.

9. A system as in claim 8, wherein the coupler is of the type comprising a pair of locking levers and a pair of pins disposed, respectively, on opposite sides of the coupler, said levers being, respectively, pivoted on said pins between a locking position and an engaged, locking position, further characterized in that the pins on which the levers are mounted are also employed in mounting the tag.

10. A system as in claim 9 wherein the coupler comprises
a generally tubular body,
a pair of lugs projecting outwardly from diametrically opposed sides of the tubular body the tag is in the form of a relatively thin wafer, and further characterized by a mounting block in which the tag is encapsulated, said mounting block transversely spanning the coupler body and resting on said lugs, said lever pins extending through said mounting block, said lugs and said levers in providing for the pivotal mounting of the levers and mounting of the tag.

11. A system as in claim 9, further characterized in that the means for generating an identifying signal are normally inoperative, and means, responsive to at least one of the locking levers being swung to an engaged, locking position, for rendering the means for generating an identifying signal operative.

12. A system as in claim 11 further characterized in that the means for rendering the identifying signal generating means inoperative comprise a normally open switch and the means for rendering such means operative include means for closing said switch in response to movement of one of said locking levers to its locking position.

13. A system as in claim 12, wherein the coupler comprises
a generally tubular body,
a pair of lugs projecting outwardly from diametrically opposed sides of the tubular body the tag is in the form of a relatively thin wafer, and further characterized by a mounting block in which the tag is encapsulated, and further characterized in that the normally open switch is a magnet switch disposed within said block, and the means for closing said switch comprise a magnet mounted on said lever.

14. A system as in claim 13, further characterized in that the means for rendering the identifying signal generating means inoperative comprise a second normally open switch and the means for rendering such means operative include means for closing said switch in response to movement of the other of said locking levers to its closed position.

15. A fluid handling system comprising supply fluid conduit means, and utilization fluid conduit means, wherein at least one of the conduit means comprises
a plurality of individual conduits, and the other of the conduit means comprises
at least one individual conduit, said system further comprising means for connecting the individual conduit from said other conduit means to a selected individual conduit of said one conduit means, said system further including utilization signal generating means for generating a signal indicating that desired individual conduits of the supply conduit means and the utilization conduit means are connected, said utilization signal generating means comprising (i) antenna means mounted on each adapter, (ii) means for transmitting a request signal from each antenna means, (iii) a tag mounted on each coupler, said tag comprising means for generating an identifying signal, said means for generating an identifying signal being actuated by the request signal transmitted from the antenna means when the desired individual conduits of the supply and utilization conduit means are connected to each other, and (iv) means, responsive to generation of said identifying signal, for generating the utilization sisal indicative of the individual conduits which are connected, characterized in that each antenna means comprises a wound coil disposed generally concentrically of the conduit with which it is associated and generates a magnetic field which is disposed coaxially of that conduit, said magnetic field being toroidal and having a longitudinal dimension substantially greater than its diameter, wherein the connecting means include locking means engageable to lock the distal end of an individual conduit of one conduit means in sealed relation on any individual conduit of the other conduit means, and further characterized in that the utilization signal generating means include means for indicating that the locking means are engaged to lock connected individual conduits.

16. A system as in claim 15, further characterized in that the identifying signal generating means of the tag are normally inoperative, and the means for indicating that the locking means are engaged include means for rendering the identifying signal generating means operative in response to engagement of said locking means.

* * * * *